Sept. 30, 1969     G. B. DUNNINGTON ET AL     3,470,288

ROLL ORIENTING PROCESS

Filed Oct. 2, 1967     6 Sheets-Sheet 1

INVENTORS
GORDON BEALE DUNNINGTON
REUBEN THOMAS FIELDS

BY *Frank C. Hilberg Jr.*

ATTORNEY

INVENTORS
GORDON BEALE DUNNINGTON
REUBEN THOMAS FIELDS

BY Frank C. Hilberg Jr.

ATTORNEY

Sept. 30, 1969   G. B. DUNNINGTON ET AL   3,470,288
ROLL ORIENTING PROCESS
Filed Oct. 2, 1967   6 Sheets-Sheet 6
FIG. 9
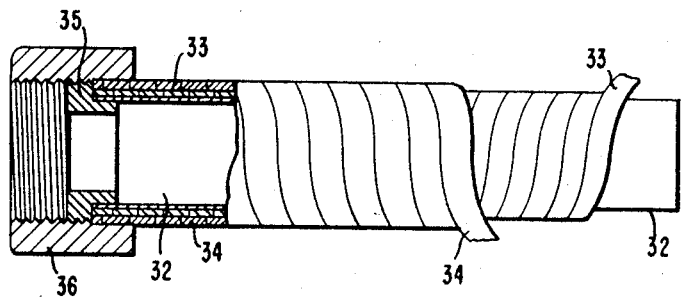
FIG. 10            FIG. 11
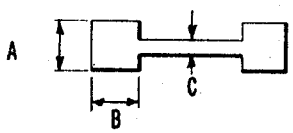   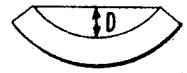
INVENTORS
GORDON BEALE DUNNINGTON
REUBEN THOMAS FIELDS
BY *Frank C. Hilberg Jr.*
ATTORNEY

3,470,288
ROLL ORIENTING PROCESS
Gordon B. Dunnington and Reuben T. Fields, Wilmington, Del., assignors to E. I. du Pont de Nemours and Company, Wilmington, Del., a corporation of Delaware
Continuation-in-part of application Ser. No. 473,543, June 4, 1965, which is a continuation-in-part of application Ser. No. 195,468, May 17, 1962. This application Oct. 2, 1967, Ser. No. 672,155
Int. Cl. D01f 7/06; B29d 7/22
U.S. Cl. 264—210            11 Claims

ABSTRACT OF THE DISCLOSURE

Roll orienting thermoplastics such as polyamides and amorphous polyesters to produce high strength strapping.

CROSS REFERENCES TO RELATED APPLICATIONS

This application is a continuation-in-part of application Ser. No. 473,543 filed June 4, 1965 by Gordon B. Dunnington and Reuben T. Fields and now abandoned, which, in turn, is a division of application Ser. No. 275,480 filed Apr. 22, 1963 by Gordon Beale Dunnington and Reuben Thomas Fields, which, in turn, is a continuation-in-part of application Ser. No. 195,468 filed May 17, 1962 by Gordon B. Dunnington and Reuben T. Fields, now abandoned.

BACKGROUND OF THE INVENTION

The conventional strapping used to bind large containers is currently made from steel. Another type of strapping which is widely used where the very high strengths of steel are unnecessary is a strap formed of a series of parallel rayon cords held together by means of a binder. This latter type of strapping is described in U.S. Patent No. 3,028,281, issued Apr. 3, 1962 to Thomas J. Karass.

Steel strapping has high strength but suffers from the disadvantages of often having sharp edges which present a safety hazard, it does not burn and presents a disposal problem after use, and it cannot be stretched when wrapped about a container so that it will shrink or relax as the container shrinks, as typically happens with wood crates or containers so as to maintain the container in its original tightly bound condition. Strapping made from parallel rayon cords suffers from the disadvantages of too low a tensile break strength for use on large crates and a very low transverse strength such that the cords will pull apart if not uniformly fastened when placed in use.

SUMMARY OF THE INVENTION

This invention has as an object the manufacture of a strap which has a strength high enough to act as a substitute for steel strapping but which can be readily disposed of after use by burning, which will not have sharp edges, which can be stretched when wrapped about a package and which will shrink about the package so as to retain tension as the package shrinks. A further object is to produce a strapping which has sufficiently high transverse strength so that it will not readily pull apart if not uniformly fastened. Another object is to produce high strength plastic shapes of various configurations.

These objects are accomplished by the following invention in which a crystallizable synthetic polymer selected from the class consisting of crystalline thermoplastic polyamides and amorphous poly(ethylene terephthalate) is extruded into a billet which is then rolled so as to produce a uniplanar, axial oriented crystalline product. The oriented polymer must be crystallizable in order to have the desired mechanical properties and to retain these properties following exposure to moderately elevated temperatures. In contrast to what had previously been believed it has now been found possible to orient amorphous poly(ethylene terephthalate) to high strength strapping. This is achieved by a controlled preheating of the billet prior to rolling such that the preheating plus the heat generated by rolling crystallizes the amorphous poly(ethylene terephthalate) during rolling. Generally, best results are obtained by passing the amorphous poly(ethylene terephthalate) billet through a preheating bath maintained at from 30° C. to 80° C. It is preferred to orient the crystals so that the polymer chains lie within a narrow angle from the direction of rolling in order to obtain the properties most useful as strapping. However, the maximum obtainable deformation may result in undesirable properties such as a tendency to split, fibrillate, or form a hairy surface. Thus, it is necessary to produce a high but carefully controlled degree of deformation. The width of the strapping is preferably from 0.7 to 1.5 times the width of the billet from which it is rolled. To accomplish this objective it has been found that the uniformity of the extruded billet prior to the roll orienting step is of extreme importance to the successful production of a high strength rolled shape. This uniformity relates both to the cross-sectional dimensions of the extruded billet and to any orientation imposed on the billet. If the billet is passed through turns before it has set or cooled sufficiently to have become solid throughout or at least have thick skins on both surfaces, the still fluid material in the interior will become displaced producing a washboard effect or differential strains. In the past this has been particularly difficult to overcome with polyamide strapping such as polyhexamethylene adipamide due to the very low strength of the molten extrudate prior to being quenched into a billet. Such an irregular billet cannot be roll oriented into a useful high strength strapping because some sections will pass their maximum orientation potential and fibrillate or become hairy before the central sections have been oriented to their optimum. Roll-oriented polymer tapes and ribbons have been made before but such prior art tapes and ribbons have not had sufficient strength to compete with steel strapping because it had not been possible to impart sufficient orientation to the tapes and ribbons for them to have the requisite strength. Such prior art tapes and ribbons are described in U.S. Patent No. 2,244,208, issued June 3, 1941 to John B. Miles. The strapping of this invention is preferably from 10 to 50 mils thick and from ¼ to ¾ of an inch wide although wider widths can be made and are desirable for some purposes such as helically wrapping large diameter pipe, and widths as narrow as ⅛ inch are useful. The billet is therefore preferably 40 mils thick and at least ¼ inch wide.

DESCRIPTION OF THE DRAWINGS

FIGURE 9 is an exploded view of a pipe made using the strapping of this invention;

FIGURE 10 is a cross-section of the strap of Example 36; and

FIGURE 11 is a cross-section of the strap of Example 37.

Figure 1:
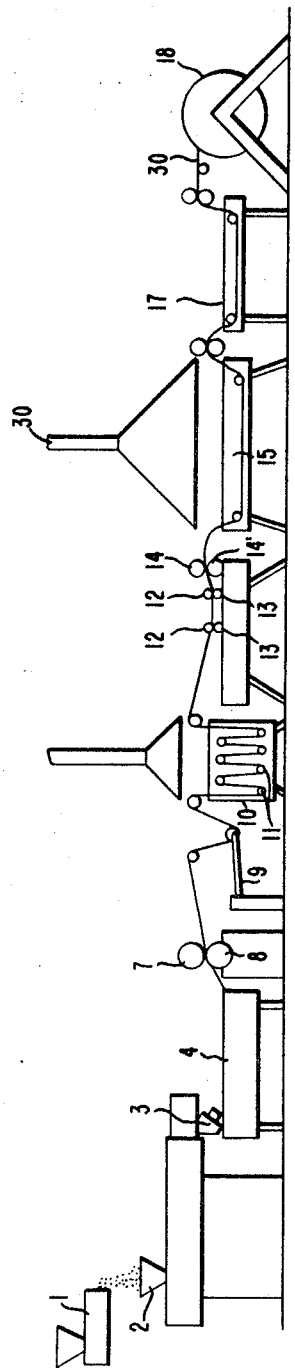
FIGURE 1 is a schematic side view of the entire apparatus.

In carrying out the process of this invention polymer powder, small pellets, or flake is fed by means of flake metering feeder 1 into the extruder hopper 2, and is extruded through extruder head 3 into a quench bath 4. The billet thus formed, is drawn out of the quench bath by rolls 7 and 8, and is fed across dancer arm 9, into preheater 10, wherein it is passed back and forth across rollers 11.

The temperature of the billet is from ambient temperature to 15° C. below the crystalline melting point of the particular polymer being roll-oriented. Although the billet can be roll oriented at room temperature the operation is performed more smoothly and with a substantial reduction in power consumption when an elevated temperature is used. It should be further noted that even though water is preferably used in the quench bath because of its ready availability and high specific heat, the billet is preferably in an anhydrous condition as it is fed into the orienting rolls. This is because the heat developed in the orientation rolls by the rearrangement of the polymer molecules in the billet may cause vaporization of any water or other low boiling liquid present, and thereby, create voids or other flaws in the strapping. The preheated billet is then fed through one or more pairs of orienting rolls 12 and 13 and is drawn under tension out of the orienting rolls by means of tension rolls 14, 14', passed through heat conditioner 15, equipped with exhaust 31, through wash tank 17 and finally is taken up onto spool 18.

Figure 2:
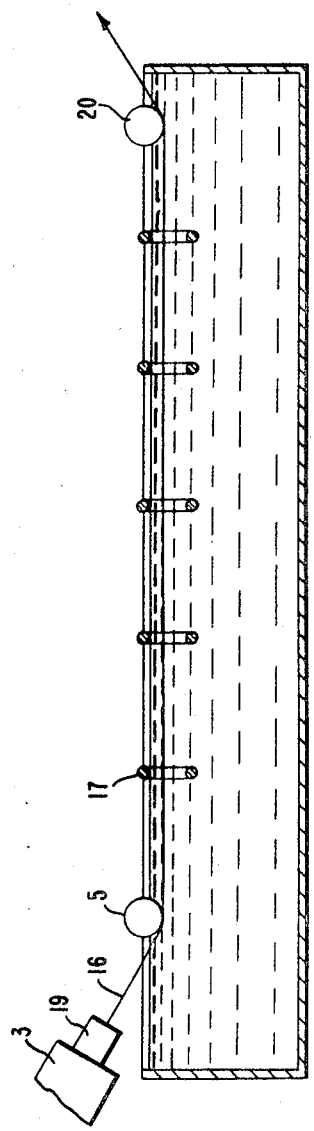
FIGURE 2 is a detailed side view of the extruder head and quench bath.

In FIGURE 2 the billet 16 is shown as it comes from the extrusion head and is passed under guide roll 5, through guide pins 17, and under roll 20 and out of the quench bath. It is preferred that the angle between the extrudate leaving the extruder head 3 and the path the billet follows through the quench bath be small. The preferred angles are from 8 to 15°. Because of the problems involved in removing the billet from the quench bath due to said billets' high stiffness it is also preferred to have a small angle of arc as the billet passes under roll 20 prior to leaving the quench bath. Therefore, the billet must run substantially parallel to the surface of the quench bath and leave the bath at an angle with the bath surface which also preferably falls within the range of from 8 to 15 degrees. It is also preferred to have the extrusion head as close to the quench bath as possible. When using a low melt strength polymer such as the polyamide of Example I, the distance between the opening 21 and die 19 and the quench bath must be less than 2 inches and preferably less than 1 inch. The path of the billet 16 is preferably parallel to and from ½ to 2 inches below the surface of the liquid in the quench bath. Guide pins 17 are necessary to keep the billet from "snaking" or forming loop-like irregularities. The billet should be guided both vertically and laterally.

Figure 3:
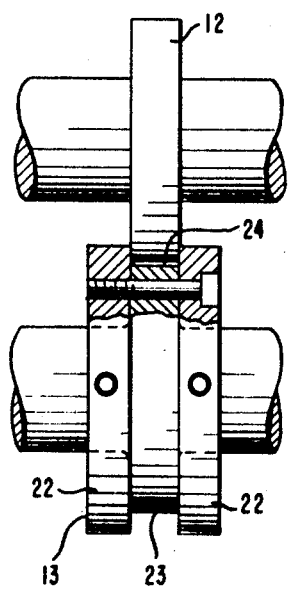
FIGURE 3 is a detailed end view of the orienting rollers.
Figure 4:
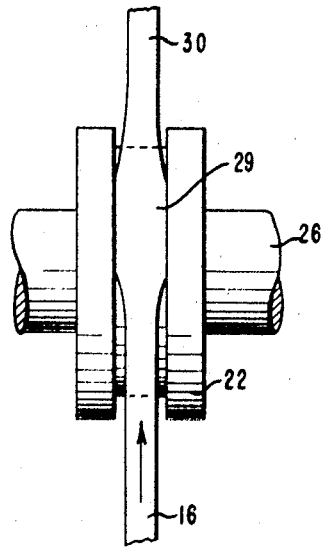
FIGURE 4 is a view of the strapping as it passes through one of the grooved orientation rolls.
Figure 5:
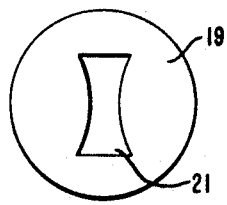
FIGURE 5 is an end view of the extrusion die showing the shape of the die opening.

FIGURE 3 shows the construction of the orienting rolls. It is to be understood that while two pairs of orienting rolls are shown in FIGURE 1, any desired number of rolls may be used. As can be seen from FIGURE 3, each pair of rolls is of tongue and groove construction with one roll having flanges 22 bolted to the central portion 23. This grooved roll can also be formed of integral construction. The function of the flanges 22 is to assist in controlling the width of the oriented strapping by controlling the size of opening 24. These rolls are driven by means of shafts formed integral therewith. The way in which the flanges 22 assist in controlling the width of the strapping is shown in FIGURE 4. The billet 16 enters the nip of the rolls 13 (and 12 not shown for clarity) and expands in width up to the limits of the flanges as at 29, preferably as to barely miss or lightly contact the flanges, the oriented strapping 30 then passes on either to another pair of orienting rolls or to tensioning rolls 14. The amount of tension on strapping 22 imposed by tension rolls 14, 14' controls the amount of decrease in width the strapping undergoes after leaving orienting rolls 12 and 13. The amount of tension imparted by rolls 14, 14' varies with the particular polymer being oriented. In general the tension is only enough to cause the billet to feed uniformly and without any substantial slippage at the nip of the orienting rolls. The strappings of this invention are distinguished from films in that they are 10 mils or over thickness. The amount of stretch or necking down of the strapping on leaving the orienting rolls must be accurately controlled since the width of the final strapping is preferably within ±0.005 inch of the width being sought or the strapping cannot readily be fastened with commercially available fasteners. These fasteners generally are heavy gage metal seals or clips which fit around the strapping joint and are crimped with a machine similar to that commercially used to join steel strapping, such as those illustrated in U.S. Patent No. 3,028,-281, except preferably with straight sides or edges. Clips or seals require width tolerances. In order to obtain a uniform rectangular billet it is necessary to have the corners of the extrusion die somewhat oversize as is illustrated in FIGURE 5. By using a die of this shape the tendency of the extrudate towards becoming round is overcome and a billet of truly rectangular cross-section can be obtained. If a rectangularly shaped die opening is used, the billet will have a nearly oval cross-section, and excessive cross orientation will be imposed by the orienting rolls, thereby lowering the amount of length deformation which can be imposed on the strapping which in turn lowers its ultimate strength and usefulness.

As has been pointed out above, the polymers suitable for use in this invention are crystalline or crystallizable. Poly(ethylene terephthalate) is amorphous as extruded but can be converted to a crystalline form which will yield straps. Rolling or heating above the glass temperature of 80° C. will convert amorphous poly(ethylene terephthalate) to the crystalline form. Amorphous polymers such as polymethyl methacrylate cannot be oriented to an extent sufficient to give the high tensile strengths necessary in strapping.

Crystalline polymers are those polymers which show crystallographic reflections when examined with X-rays. Conversely, amorphous poly(ethylene terephthalate) quenched from the melt is amorphous below 80° C. at which point it crystallizes. Suitable crystalline polyamides include polycaprolactam, polyhexamethylene adipamide, and polyhexamethylene sebacamide. Polyamides containing from 0.2 to 5 weight percent of a plasticizer are especially preferred. Polyhexamethylene adipamide, polycaprolactam and polyhexamethylene sebacamide are all suitable polyamides for use in such plasticized polyamide straps. The plasticizers which are useful in modifying the polyamides with respect to this invention are those plasticizers which are compatible with polyamides, and melt below 150° C. and boil above 200° C. Such suitable plasticizers include 2-ethyl hexane diol-1,3, tetramethylene sulfone, N-ethyl toluene sulfonamide-o&p, p-toluene sulfonamide, di-n-butyl malate and n-butyl tartrate. Straps made of such plasticized polyamides can consistently be made to have tensile breaking strengths of over 70,000 p.s.i., with improved modulus. The addition of plasticizer to the polyamides also results in improved processability of the billets into strapping. This improvement greatly reduces the number of breaks encountered when orienting the strapping when rolling at high deformation ratios such as at from 4.3–5.0 to 1.

DESCRIPTION OF THE PREFERRED EMBODIMENTS

In each of the following examples the strapping was made on the apparatus above described using three-inch diameter orienting rolls. In all of the examples the die head was maintained at less than one inch from the quench bath. The quench bath was water maintained at temperatures of from ambient to 50° C. in all cases reported in Table I. The tensile strength and modulus data were obtained in a conventional test machine equipped with slotted mounting rolls with a one-inch per minute loading rate and a five inch separation between rolls. The test results are all based on the original dimensions of the strapping. In Table I, R.V. stands for relative viscosity which for the polyamides was obtained in accordance with A.S.T.M.-D-789. The relative viscosity of the poly-(ethylene terephthalate) was obtained at 20° C. from an 8.7 wt. percent solution in "formal." "Formal" is a solvent consisting of 7 parts 2,4,6-trichloro phenol and 10 parts phenol.

In Examples 18 to 20 the polymer contained 1 weight percent; in Example 21, 2 weight percent; in Examples 22 and 23, 5 weight percent; in Examples 24 and 25, 0.1 weight percent; and Examples 26 to 28, 0.5 weight percent of N-ethyl toluene sulfonamide (o&p) as a plasticizer. In Examples 29 to 31, 1 weight percent of 2-ethyl hexane diol-1,3 was employed as a plasticizer. In Examples 32 and 33, 1 weight percent of tetramethylene sulfone, and in Examples 14, 34, and 35, 1 weight percent of $\omega$-caprolactam. In Example 36 the strap had a dumbbell cross-section with thick edges and a thin center area as shown in FIGURE 10. The strap of Example 36 was .497 in. wide, the thick edges as at A were 27 mils thick and $\frac{1}{16}$ in. wide as at B and the center portion as at C was 19 mils thick. In Example 37, the strap had a C shaped cross-section as illustrated in FIGURE 11. The C in the strap of Example 37 had a curvature such that the low point of the convex side as at D was .035 in. below a straight line drawn between the two edges. In both Examples 36 and 37, the billet had a rectangular cross-section and the final shape of the strap was formed by using orienting rolls corresponding to the shape of the final strap. The polycaprolactam used in Example 60 is not cross-linked and is formed by mixing 300 parts of $\omega$-caprolactam with 4 parts of NaH to form one stream, mixing 100 parts of caprolactam with 1.2 parts of phenyl isocyanate to form a second stream and then mixing the two streams at 150° C. Polymerization occurs in one minute accompanied by an adiabatic temperature rise to 200° C. The polymer is then fed to a vacuum extruder to extract the remaining monomer and to supply melt to the billet die at 240° C.

TABLE I

| Ex. | Material | Billet speed, ft./min. | Melt temp., °C. | Width, in. | Thickness, mils | Deformation ratio Length | Deformation ratio Width | Melt draw | Rolling temp., °C. | Tensile strength p.s.i. |
|---|---|---|---|---|---|---|---|---|---|---|
| 1 | Polyhexamethylene adipamide (RV 53) | 300 | 280 | | 20 | 4.27 | 1.0 | | 185 | 65,000 |
| 2 | do | 300 | 280 | | 21 | 4.15 | 1.0 | | 200 | 61,400 |
| 3 | do | 300 | 280 | | 21 | 4.20 | 1.0 | | 150 | 67,000 |
| 4 | do | 60 | 280 | | 21 | 4.26 | | 1 | | 67,900 |
| 5 | do | 300 | 280 | | 19.5 | 4.55 | | 1 | | 70,000 |
| 6 | do | 150 | 280 | | 18.5 | 4.77 | | 1 | | 70,800 |
| 7 | do | 150 | 280 | | 17.5 | 4.75 | | 4 | | 57,200 |
| 8 | do | 150 | 280 | | 22 | 4.00 | | 2 | | 60,800 |
| 9 | do | 150 | 280 | | 18.5 | 4.71 | | 2 | | 74,800 |
| 10 | do | 150 | 280 | | 21.5 | 4.04 | | | 25 | 50,200 |
| 11 | do | 150 | 280 | | 19 | 4.44 | | | 200 | 67,000 |
| 12 | do | 150 | 280 | .570 | 17.5 | 4.02 | 1.22 | | 180 | 69,200 |
| 13 | do | 150 | 280 | .588 | 16.5 | 4.38 | 1.25 | | 180 | 66,100 |
| 14 | Polycaprolactam (RV 325) | 75 | 275 | .613 | 27 | 4.1 | 1.08 | | 150 | 46,300 |
| 15 | Polyethylene terephthalate (RV 30) amorphous form | 75 | 275 | .437 | 26 | 3.92 | 0.70 | | 50 | 33,000 |
| 16 | do | 75 | 275 | .503 | 18 | 4.23 | 0.80 | | 50 | 44,200 |

| | | | | | Cycle to 35,000 p.s.i. Stress | | | Width of X-Ray Peaks at ½ Max., Degrees | | |
|---|---|---|---|---|---|---|---|---|---|---|
| | | | | | | | | Tilt of Chains | | Tilt of (0.10) Planes Above Rolled Surface |
| Ex. | Material | Elong. at Break, Percent | Tangent Modulus, p.s.i. | Transverse Strength, p.s.i. | Elong. at 35,000 p.s.i. | Elong., Return to 17,500 p.s.i. | Elong. on Return to 10 Lbs. | Roll Direction →Thickness Direction | Roll Direction →Transverse Direction | |
| 1 | Polyhexamethylene adipamide (RV 53). | 10 | 780,000 | | 6.3 | 4.9 | 1.25 | 17.6 | 20.0 | 29.4 |
| 2 | do | 11.5 | 664,000 | | 6.8 | 5.4 | 1.5 | 18.8 | 21.2 | 31.2 |
| 3 | do | 12 | 774,000 | | 5.75 | 4.3 | 0.6 | 20.6 | 21.6 | 30.8 |
| 4 | do | 15.1 | 696,000 | 13,200 | | | | | | |
| 5 | do | 9.5 | 873,000 | | | | | | | |
| 6 | do | 9.6 | 962,000 | | | | | | | |
| 7 | do | 7.0 | 973,000 | | | | | | | |
| 8 | do | 11.4 | 674,000 | 14,000 | | | | 18.8 | 21.6 | 32.8 |
| 9 | do | 11.0 | 909,000 | 12,000 | | | | 17.6 | 18.4 | 27.6 |
| 10 | do | 13.9 | 665,000 | | | | | | | |
| 11 | do | 12.4 | 775,000 | | | | | 18.4 | 21.6 | 30.4 |
| 12 | do | 13.8 | 693,000 | 14,900 | | | | | | |
| 13 | do | 12.1 | 694,000 | 14,000 | | | | | | |
| 14 | Polycaprolactam (RV 325) | 10 | 599,000 | | | | | | | |
| 15 | Polyethylene terephthalate (RV 30) amorphous form. | | 620,000 | 6,280 | (Yield at 26,500 p.s.i.) | | | | | |
| 16 | do | | Low | 7,950 | 8.80 | 8.13 | 6.00 | | | |

TABLE I—Continued

| Ex. | Material | Billet speed, ft./min. | Melt. Temp., °C. | Width, In. | Thickness, Mils | Deformation Ratio, length | Rolling Temp., °C. | Tensile Strength, p.s.i. | Tangent Modulus, p.s.i. | Transverse Strength, p.s.i. | Elong. at 35,000 p.s.i. |
|---|---|---|---|---|---|---|---|---|---|---|---|
| 17 | Polyhexamethylene adipamide (RV 53). | 150 | 280 | .502 | 20 | 4.76 | 190 | 70,900 | 954,000 | 8,080 | 5.15 |
| 18 | do | 150 | 280 | .530 | 15 | 4.95 | 190 | 74,600 | 819,000 | 11,000 | 6.25 |
| 19 | do | 150 | 280 | .522 | 16 | 4.80 | 110 | 75,900 | 908,000 |  | 6.42 |
| 20 | do | 150 | 280 | .526 | 15 | 4.96 | 150 | 79,900 | 913,000 | 10,200 | 6.03 |
| 21 | do | 150 | 280 | .530 | 19.5 | 4.40 | 170 | 70,900 | 900,000 |  | 6.98 |
| 22 | do | 150 | 280 | .530 | 16 | 4.85 | 175 | 72,400 | 801,000 |  | 5.90 |
| 23 | do | 150 | 280 | .522 | 16 | 5.05 | 125 | 73,700 | 937,000 |  | 6.03 |
| 24 | do | 150 | 280 | .529 | 19 | 4.29 | 190 | 71,400 |  |  |  |
| 25 | do | 150 | 280 | .530 | 17 | 4.70 | 190 | 70,400 | 781,000 | 11,400 | 6.37 |
| 26 | do | 150 | 280 | .529 | 17 | 4.65 | 190 | 75,300 |  |  |  |
| 27 | do | 150 | 280 | .529 | 16 | 4.97 | 190 | 78,800 | 773,000 | 11,200 | 6.90 |
| 28 | do | 150 | 280 | .530 | 15 | 5.05 | 190 | 75,900 |  |  |  |
| 29 | do | 150 | 280 | .504 | 20 | 4.56 | 175 | 76,800 |  |  |  |
| 30 | do | 150 | 280 | .502 | 18 | 4.99 | 175 | 76,400 |  |  |  |
| 31 | do | 150 | 280 | .503 | 18 | 5.19 | 175 | 72,700 |  |  |  |
| 32 | do | 150 | 280 | .502 | 21 | 4.18 | 175 | 72,300 |  |  |  |
| 33 | do | 150 | 280 | .501 | 20 | 4.37 | 175 | 78,800 |  |  |  |
| 34 | Polycaprolactam (RV 55) | 150 | 240 | .499 | 20 | 4.50 | 125 | 71,400 | 840,000 | 9,820 | 7.75 |
| 35 | do | 150 | 240 | .499 | 20 | 4.62 | 125 | 71,700 | 848,000 | 9,900 | 7.25 |
| 36 | Polyhexamethylene adipamide (RV 53). | 15 | 280 | .497 |  | 4.36 | 175 | 60,500 | 797,000 |  | 6.08 |
| 37 | do | 16 | 280 | .512 | 21 | 4.23 | 175 | 60,700 | 639,000 |  | 5.94 |
| 38 | Polycaprolactam (RV 55) | 150 | 240 | .503 | 20 | 4.49 | 190 | 61,700 |  |  |  |
| 39 | do | 150 | 240 | .503 | 18 | 4.85 | 190 | 63,400 |  |  |  |
| 40 | Polycaprolactam | 150 | 240 | .5 | 20 | 4.5 | 125 | 70,500 |  |  |  |

*Initial modulus, p.s.i.

Example 41

Poly(ethylene terephthalate) (relative viscosity=30) is extruded and quenched in cold water to give a billet which is substantally amorphous as determined by X-ray diffraction. When a piece of the billet is exposed in an oven at about 130–140° C., it first becomes limp and then stiffens, reflecting the change from an amorphous glass to a rubbery state and finally to a crystalline solid. The billet is passed through an oil bath at 50° C. to reduce its modulus and improve toughness without causing crystallization. The billet is then passed through orienting rolls and tensioning rolls so as to extend the length 4.52X and reduce the width by 13%. The dimensions of the resulting tape are .017" x .545", and its tensile strength is 48,200 p.s.i. in the direction of orientation. The initial modulus is 1,730,000 p.s.i., and the tangent modulus at 35,000 p.s.i. is 853,000 p.s.i. and the elongation at 35,000 p.s.i. is 3.25% and the tensile strength in the transverse direction is 8300 p.s.i. X-ray diffraction shows that the oriented tape is crystalline.

Example 42

Poly(ethylene terephthalate) (relative viscosity=29) is extruded using a solids metering extruder as described in U.S. Patent No. 3,325,865 issued June 20, 1967, to Gordon Beale Dunnington and Reuben Thomas Fields, and quenched in cold water to give a substantially amorphous billet. The billet is preheated at 60° C., passed through a pair of orienting rolls and a tension take-off at a linear speed 1.30 times the surface speed of the orienting rolls. The deformation ratio is 5.32, and the dimensions of the oriented tape are .019" x .448". The tensile strength is 69,000 p.s.i. in the orientation direction and 4800 p.s.i. in the transverse direction. The tangent modulus at 35,000 p.s.i. is 1,576,000 p.s.i. Measurements by X-ray diffraction show that the preferred orientation is axial uniplanar. The orientation distributions are characterized by the following angular widths at half maximum. Polymer chain direction: roll direction toward the surface normal—12.5°, roll direction toward the transverse direction 18.4°. Vector normal to the (100) crystal plane: surface normal toward transverse direction—40.8°.

Example 43

Example 42 is repeated except that the relative viscosity is 45.5, and the preheat temperature is 67° C. The deformation ratio is 4.98, and the dimensions are .0186" x .440". The tensile strength is 61,500 p.s.i. in the roll direction and 8680 p.s.i. in the transverse direction. The initial modulus is 2,200,000 p.s.i., the tangent modulus at 35,000 p.s.i. is 1,610,00 p.s.i. and the elongation at 35,000 p.s.i. is 2.08%.

Example 44

Example 42 is repeated except that the deformation ratio is 5.74, and the dimensions are .0176" x .462". The tensile strength is 68,000 p.s.i. in the roll direction and 4800 p.s.i. in the transverse direction. The tangent modulus is 1,767,000 p.s.i. When subjected to a tensile stress of 35,000 p.s.i. in the roll direction, the tape elongated 1.98% after one minute and 2.55% after one hour, but there is no additional elongation during the next 300 hours.

Example 45

Poly(ethylene terephthalate) (relative viscosity=27.6) is extruded and quenched to give a substantially amorphous billet. The billet is passed through orienting rolls and a take-off having a linear speed 1.33 times the surface speed of the orienting rolls. The deformation ratio is 5.14 and the dimensions are .0177" x 4.67". The tensile strength is 60,600 p.s.i. in the roll direction and 7950 p.s.i. in the transverse direction. The initial modulus is 2,002,000 p.s.i., the tangent modulus is 1,735,000 p.s.i. and the elongation at 35,000 p.s.i. is 2.00%. The following elongation measurements are recorded during a creep test under a tensile stress of 35,000 p.s.i.: 2.43% at one minute, 2.78% at one hour, 2.86% at 24 hours and 2.95% at 300 hours.

Example 46

Poly(ethylene terephthalate) is extruded by a continuous molding process and quenched to give a substantially amorphous .091" x 3.40". The billet is oriented as in Example 45 to give a tape .0223" x 3.05" which is slit to a width of 2.26". The deformation ratio is 5.14. The tensile strength is 52,400 p.s.i. in the roll direction and 6990 p.s.i. in the transverse direction. The initial modulus is 1,626,000 p.s.i., the tangent modulus is 1,451,000 p.s.i. and the elongation at 35,000 p.s.i. is 2.28%.

The term "uniplanar, axial orientation" employed in defining the product of this invention may be fully understood from the following discussion.

"Axial," "planar," and "uniplanar axial" indicate different types of crystal orientation in high polymeric materials. "Axial" orientation means that a given crystal axis (frequently the polymer chain axis) is parallel to a macroscopic axis (e.g., the machine direction in an extruded object). For example, prior art materials which had been drawn in only one direction (e.g., fibers or one-way stretched films) generally exhibit an appreciable degree of axial orientation in which the polymer chain axes are aligned parallel to the stretched direction. "Planar" orientation means that a given crystal axis is parallel to a macroscopic level plane. Conventional two-way stretched films for example generally exhibit a degree of planar orientation in that the molecular chain axes lie approximately parallel to the surface of the film although said axes are arranged at random within this plane. "Uniplanar axial" orientation means a given crystal axis is parallel to a macroscopic axis and a given crystal plane is parallel to a macroscopic plane. In the rolled, extruded shapes discussed here the molecular chain axis is generally in the direction of rolling and a certain crystal plane is parallel to the rolled surface. As used here the terms "axial," "planar," and "uniplanar axial" orientation refer not only to perfect alignment of the types discussed but also to structures in which there is a preferred orientation even though there may be some angular distributions about the preferred orientation. Roll-oriented polymers generally exhibit "uniplanar, axial orientation."

X-ray diffraction furnishes a convenient technique for observing the type of orientation in the objects of this invention. A sample is mounted on an instrument such as a Single Crystal Orienter which has the ability to rotate the sample in the X-ray beam about two mutually perpendicular axes. Since a crystalline material will diffract X-rays only when the X-ray beam, the detector, and suitable crystalline planes within the sample are arranged in the manner described by Bragg's Law, it is possible to determine the crystal orientation within the sample by studying the variation in the intensity of the diffracted X-rays as the sample is rotated. This intensity will pass through a maximum as the angular orientation of the sample reaches a value corresponding to the most populous orientation of the crystals within the sample. The breadth of the distribution of crystal orientations may be characterized by the width of a plot of X-ray intensity vs. the angular orientation of the sample at an intensity value equal to one-half of the peak maximum. Further aspects of the definition of the types of orientation and of techniques for determining the distribution of crystal orientation in synthetic polymers are described in a paper by C. J. Heffelfinger and R. L. Burton in the Journal of Polymer Science, volume 47, pages 289–306 (1960).

In an extruded, rolled shape made from polyhexamethylene adipamide, the uniplanar axial orientation is such that the polymer chains tend to be in the direction of rolling and the (010) crystal planes tend to be parallel to the rolled surface. The angular width at the one-half maximum corresponding to the tilting of the polymer chains from the roll direction toward the thickness direction is less than 23°. in the preferred structures. The tilting of the polymer chains from the roll direction toward the transverse direction is characterized by an angle of less than 23°. The tilting of the (010) planes about the roll direction away from parallellity with the roll surface is characterized by an angle of less than 35° in the preferred structures. These angles correspond to those obtained for uniplanar axial orientation in polyhexamethylene adipamide which has been rolled to increase its length at least four-fold. The other polymers useful in this invention will have corresponding angles for the deviation of polymer chain axes from the direction of rolling equal to or less than those cited. However, the uniplanarity may be less sharply defined in other useful polymers. The half maximum tilting of the chains from the roll direction toward the thickness or the transverse direction is preferably less than 23° for all resins.

It is well known in the art that controlled deformation of a crystalline polymer results in an improvement in the physical properties of the polymer in the direction of deformation. This is most highly developed in the case of fiber and filaments where very marked improvement in tensile strength and modulus with an axial orientation is obtained by cold drawing of the extruded fiber of filament. Attempts to obtain equivalent improvement in physical properties in more massive plastic shapes with triaxial symmetry such as tapes, straps, sheets, angles, T's, and the like have not been successful, although significant improvement has been obtained in many cases. Failure to obtain the enhancement in physical properties equivalent to high quality fibers can probably be traced to the failure to obtain the required perfection and type of structure in these more massive objects with triaxial symmetry. The above examples illustrate the achievement of the required perfection of structure with crystalline polymers and copolymers by careful control of the polymer and the processing at high nondestructive deformations.

These unique plastic materials are characterized by a high perfection in the structure, high tensile strength combined with high modulus, and excellent recovery from high load. These same properties are exhibited by high quality fibers which have uniaxial orientation with circular symmetry. These new materials differ in being relatively massive with multiaxial orientation.

Figure 6:
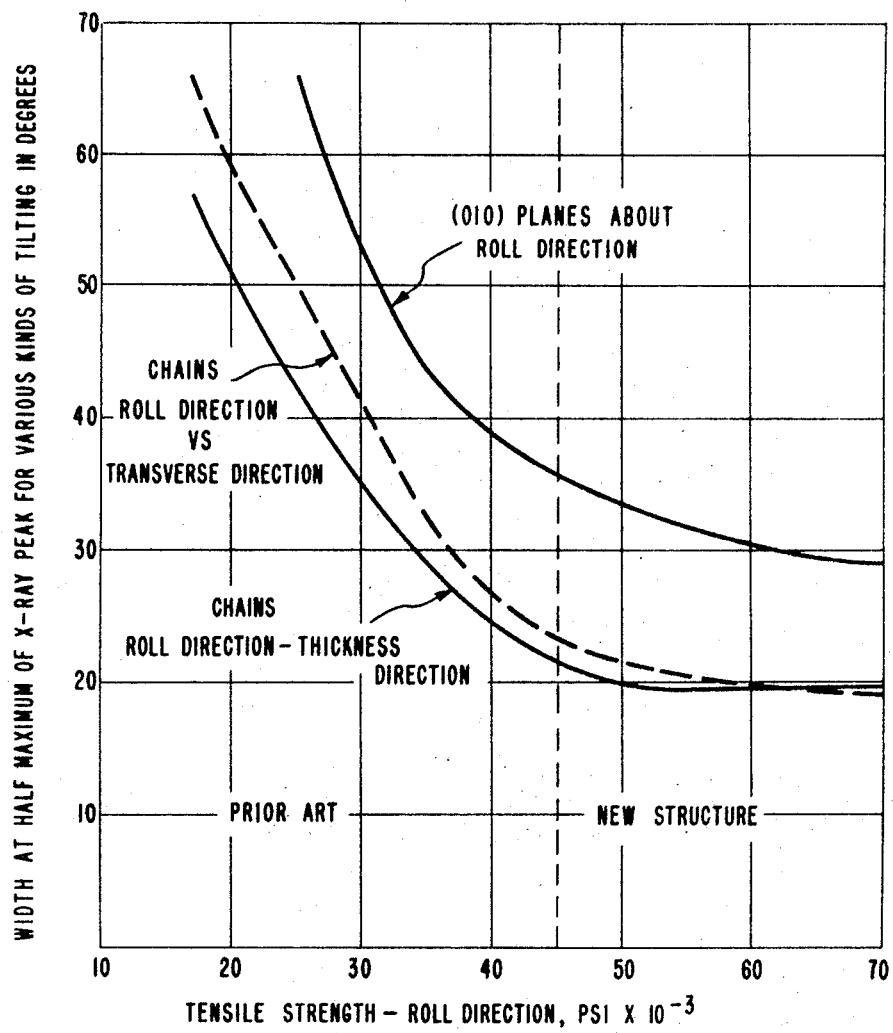
FIGURE 6 is a plot of X-ray order vs. tensile strength for oriented polyhexamethylene adipamide strapping.

This degree of perfection in the structure can be measured in several ways. One well recognized in crystallography is the measurement of the sharpness of the X-ray diffraction pattern obtained along the various axes of the object. Samples of strapping made from polyhexamethylene adipamide were prepared according to the prior art (Miles U.S. Patent 2,244,208, June 3, 1941) and according to the new techniques covered in this patent. The results of these tests are summarized in FIGURE 6. As can be seen the degree of perfection obtained for these unique materials is substantially higher than the prior art along with significant improvement in strength.

Figure 7:
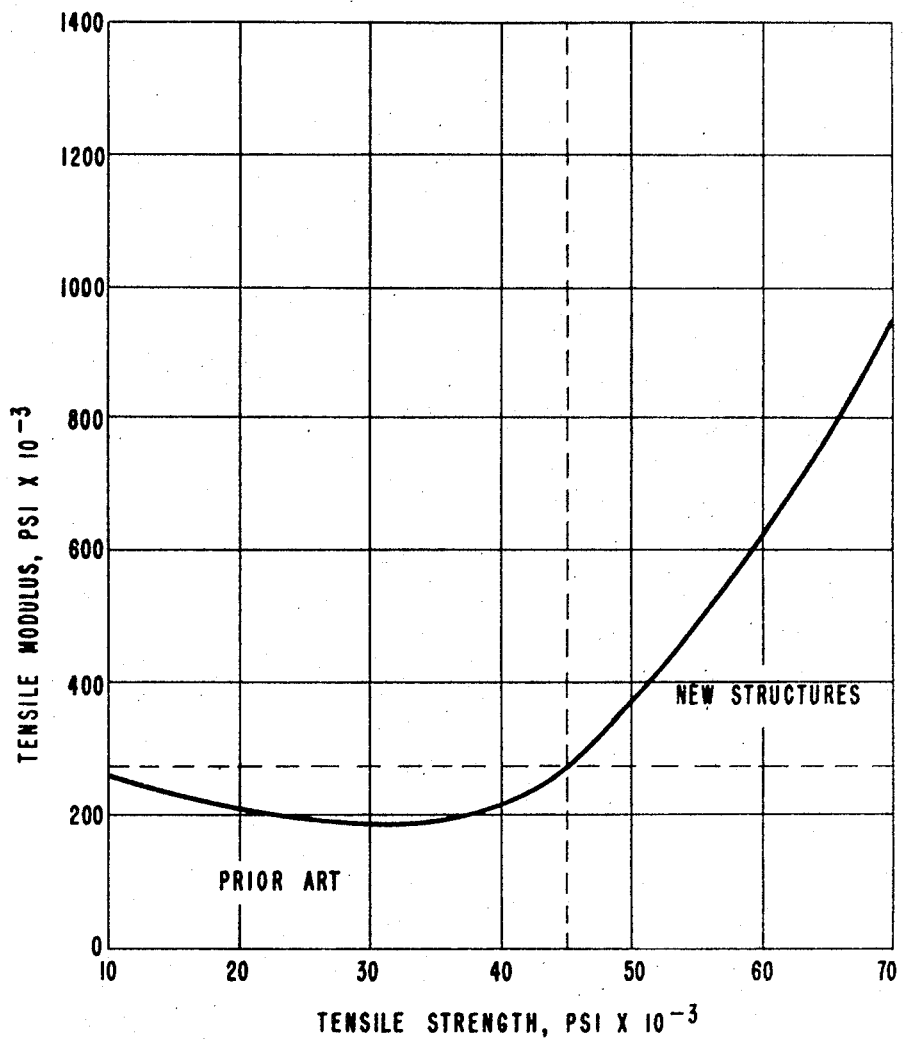
FIGURE 7 is a plot of tensile modulus vs. tensile strength for roll oriented polyhexamethylene adipamide strapping.

Although X-ray studies show the substantial differences from prior art, they are not the most sensitive and exact methods available for determining the perfection in these new materials. The most sensitive technique we have found to measure this structural difference is to plot the tensile modulus vs. the tensile strength in the main direction of orientation. This is shown in FIGURE 7, which is a plot of tensile modulus vs. strength for polyhexamethylene adipamide with a marked change in slope indicative of the onset of the unique structure with increasing strength and modulus as the structure becomes more perfect.

Figure 8:
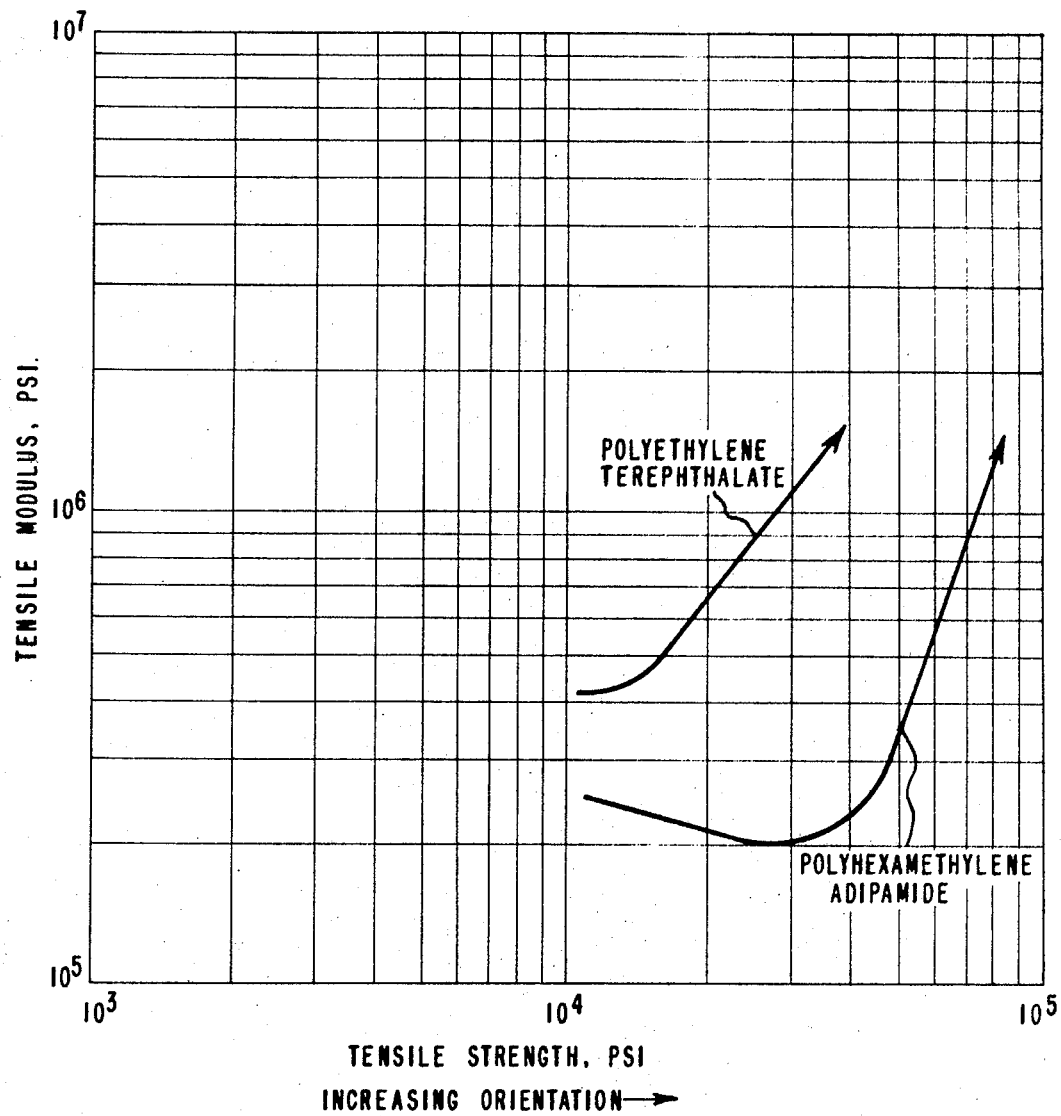
FIGURE 8 is a logarithmic plot of tensile modulus vs. tensile strength for the roll oriented plastic strappings of this invention.

Similar results for both X-ray studies and property studies have been obtained by orienting other crystalline polymers under conditions to develop these unique structures. FIGURE 8 is a plot on a log-log scale of tensile modulus vs. tensile strength for the polymers of the present invention which exhibit the same marked change when processed to give the unique structures of the present invention.

Strapping must have a high tensile tangent modulus in order to be of great utility. It is the nature of crystalline polymers that when pulled or stretched that their tensile load rises sharply to a plateau upon a relatively small elongation, this plateau extends for a deformation of several X (times) the original dimension and then again rises sharply. It is necessary to exceed the deformation represented by the point at which this plateau ends and the tensile strength vs. deformation starts to rise sharply again in order to obtain an extremely useful strapping. If this point is not reached, the strapping upon being stretched or tensioned will not return to its original longitudinal dimension but will remain permanently elongated and loose about whatever container it has been used to bind. It is preferred that a strapping upon being stretched will return to within 2% of its original longitudinal dimension. As illustrated in the examples only highly oriented strappings return to within 2% of their original dimension after receiving a substantial stress such as a 35,000 p.s.i. pull.

A high tangent tensile modulus is an indication that the strapping has been oriented or deformed to a point where it will not permanently nor unduly stretch or deform when tensioned about a package. The minimum modulus representative of the preferred strapping of this invention is 1.75 times that of the undeformed or oriented polymer of which the strapping is fabricated. The minimum deformations to achieve this preferred 1.75 × the unimproved modulus for various polymers is 4.0 × for polyhexamethylene adipamide.

Because of the expense involved in the rolling and fabrication procedures of this invention, it is necessary that a strapping have a tensile breaking strength of at least 40,000 p.s.i. in order to compete with steel strapping. Therefore, 40,000 p.s.i. represents the minimum preferred tensile break strength. It is further pointed out that while having high longitudinal strengths the straps of this invention have a transverse strength about equal to the unoriented resin and therefore have a high resistance to being pulled apart by non-uniform fastening means.

The strapping of this invention is especially useful in forming light weight, high strength pipe. Such pipe is illustrated in FIGURE 9 in which a liner 32 is helically wrapped with a first layer of strapping 33, which in turn is helically wrapped in the opposite direction with another strapping 34. The pipe can be held together by adhesively bonding the two strappings and the liner together as they are assembled. It is also possible to hold the elements of the pipe together by mechanical means as illustrated in FIGURE 9 wherein the end of the pipe is clamped onto end piece 35, by means of collar 36. If an unusually long piece of pipe is required, the liner is best pieced every 10 to 30 ft. and held together with a conventional ferrule. The two straps are then wound directly over the ferrule and a conventional hose clamp applied to hold the assembly intact.

The pipe can be made without a liner by wrapping the strapping around a mandrel, adhesively or otherwise bonding the edges together and then sliding the thus formed pipe from the mandrel. Regardless of whether a liner is used or not the optimum strength is obtained when the width of the strap is related to the diameter of the pipe such that the angle of the strap when helically wound in a laterally abutting relationship to form the pipe is 53° from the axis of the pipe. The preferred angles range from 45° to 70° from the axis of the pipe.

We claim:

1. A process for forming a highly oriented, crystalline, synthetic shape comprising the steps of extruding a synthetic thermoplastic resin selected from the class consisting of polyamides and poly(ethylene terephthalate) from an extrusion head into a quench bath of sufficient length to solidify the extrudate and thereby form a billet at least 40 mils thick and ¼ inch wide formed of a polyamide or amorphous poly(ethylene terephthalate), removing said billet from said quench bath and in the case of amorphous poly(ethylene terephthalate) passing the billet through a bath maintained at from 30 to 80° C., passing said billet between at least one pair of orienting rolls to extend the length of said billet at least 4 times to form an oriented shape while maintaining a tension on said oriented shape to control the width thereof at from 0.7 to 1.5 × the width of the billet.

2. The process of claim 1 wherein the resin is a polyamide.

3. The process of claim 2 wherein the width of the oriented shape is substantially the same as the width of the billet.

4. The process of claim 3 wherein the orienting rolls are of tongue and groove construction wherein the grooved roll has a pair of flanges between which the tongue roll fits so as to form an opening of fixed size.

5. The process of claim 4 wherein the polyamide is polycaprolactam.

6. The process of claim 4 wherein the polyamide is polyhexamethylene adipamide.

7. The process of claim 6 wherein the polyhexamethylene adipamide contains from 0.2 to 5 weight percent of a plasticizer.

8. The process of claim 7 wherein the plasticizer is N-ethyl toluene sulfonamide-(o&p).

9. The process of claim 1 wherein the resin is amorphous poly(ethylene terephthalate).

10. The process of claim 9 wherein the orienting rolls are of tongue and groove construction wherein the grooved roll has a pair of flanges between which the tongue roll fits so as to form an opening of fixed size.

11. The process of claim 9 wherein the tension is applied to the shape by means of take-off rolls having a linear speed about 1.3 × the linear speed of the orienting rolls.

References Cited

UNITED STATES PATENTS

| | | |
|---|---|---|
| 2,244,208 | 6/1941 | Miles. |
| 2,642,625 | 6/1953 | Peck. |
| 2,899,713 | 8/1959 | Lundsager. |
| 2,952,878 | 9/1960 | Swerlick et al. |
| 3,083,410 | 4/1963 | McGlamery. |
| 3,194,863 | 7/1965 | Williams et al. _____ 264—175 |
| 2,374,069 | 4/1945 | Balthis _____ 264—211 |
| 2,556,295 | 6/1951 | Pace _____ 264—85 |
| 3,066,366 | 12/1962 | Wyckoff et al. _____ 264—210 |
| 3,324,217 | 6/1967 | Armstrong et al. _____ 264—210 |

JULIUS FROME, Primary Examiner

J. H. WOO, Assistant Examiner

U.S. Cl. X.R.

18—1; 264—175, 211, 288, 291

PO-1050
(5/69)

UNITED STATES PATENT OFFICE
CERTIFICATE OF CORRECTION

Patent No. 3,470,288　　　　　　Dated September 30, 1969

Inventor(s) Gordon B. Dunnington and Reuben T. Fields

It is certified that error appears in the above-identified patent and that said Letters Patent are hereby corrected as shown below:

Table 1, Example 11, in the column labeled "Tangent Modulus, p.s.i.", delete "775,000" and insert -- 755,000 --.

Column 8, line 27, delete "1,610,00" and insert -- 1,610,000 --.

Column 8, line 57, after the word "amorphous", insert -- billet --.

SIGNED AND
SEALED
APR 28 1970

(SEAL)
Attest:

Edward M. Fletcher, Jr.
Attesting Officer

WILLIAM E. SCHUYLER, JR.
Commissioner of Patents